W. M. WHITE.
HYDRAULIC REGAINER.
APPLICATION FILED MAY 26, 1913.
1,273,557.
Patented July 23, 1918.
3 SHEETS—SHEET 2.
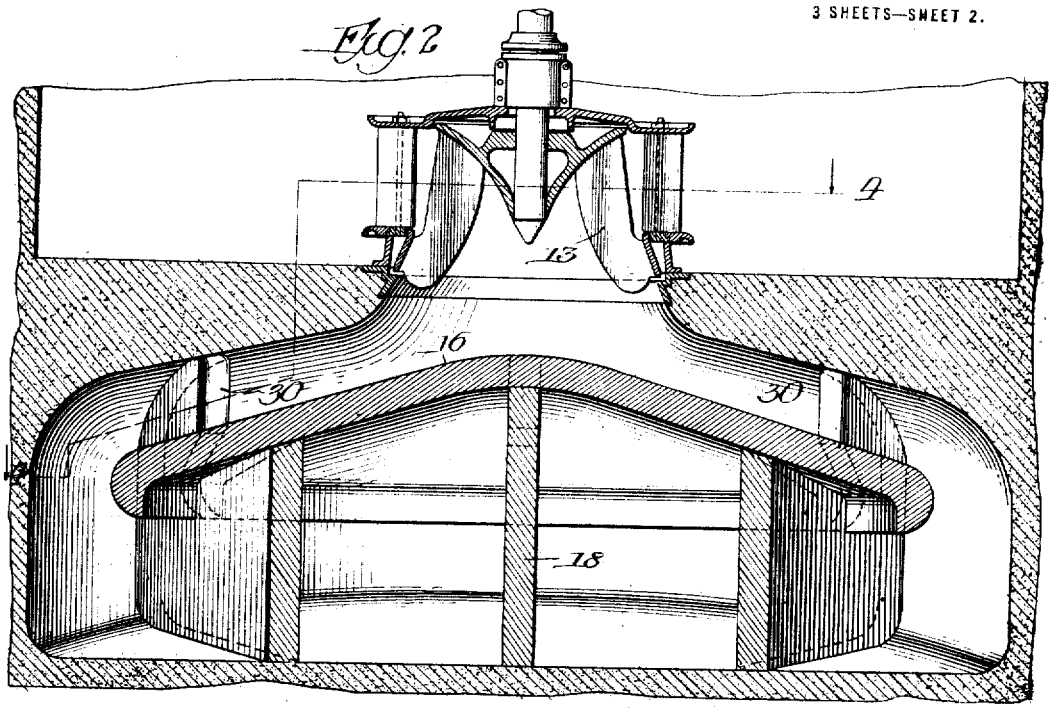
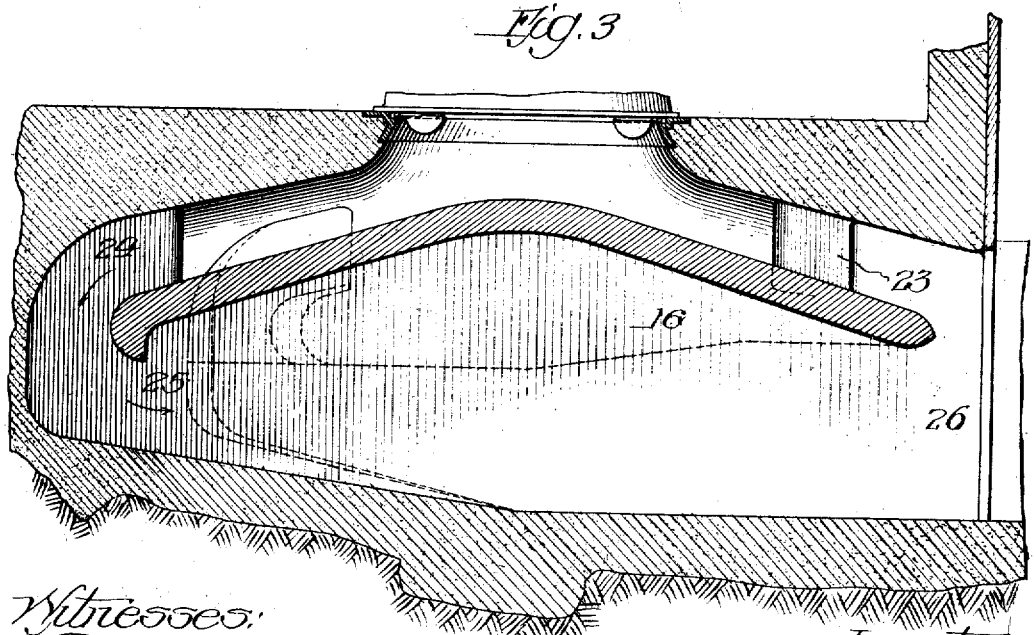

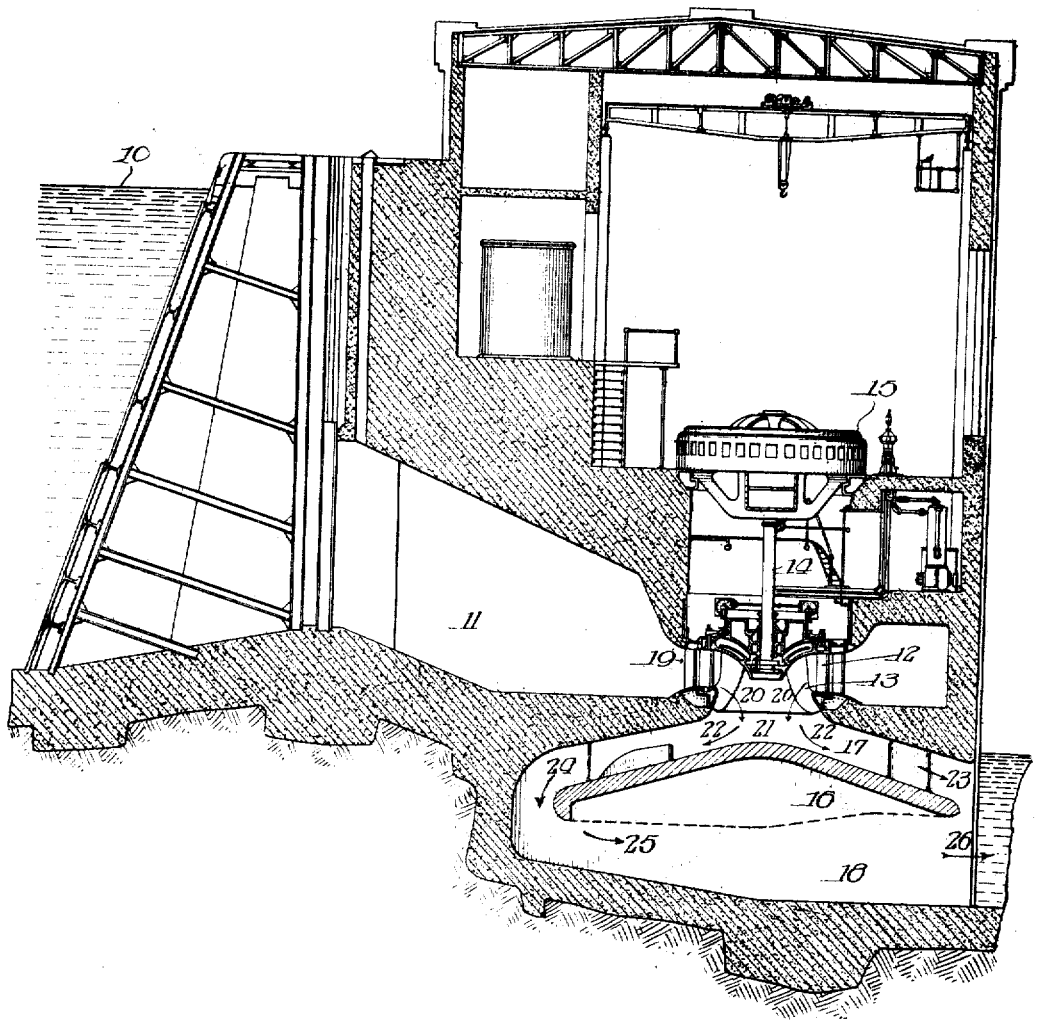

W. M. WHITE.
HYDRAULIC REGAINER.
APPLICATION FILED MAY 20, 1913.
1,273,557.
Patented July 23, 1918.
3 SHEETS—SHEET 3.
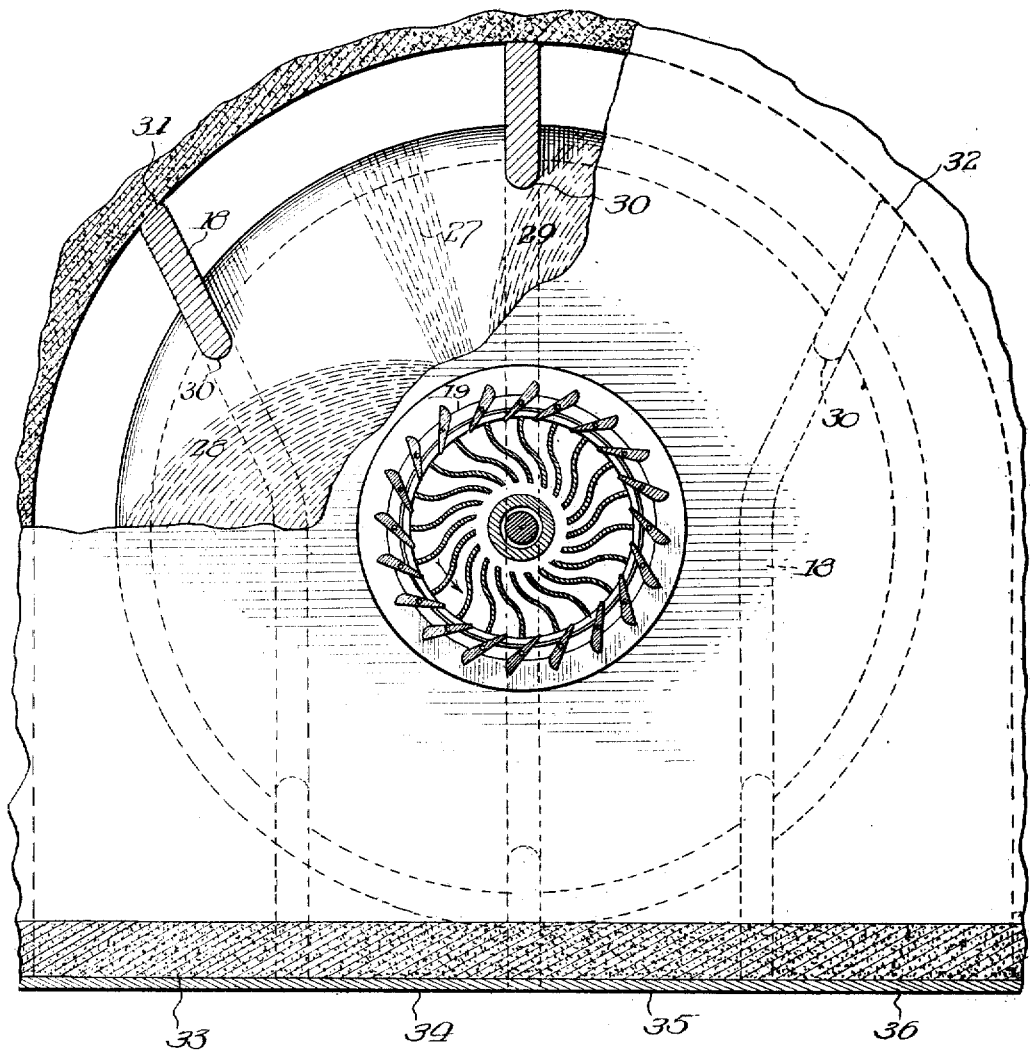

UNITED STATES PATENT OFFICE.

WILLIAM M. WHITE, OF MILWAUKEE, WISCONSIN.

HYDRAULIC REGAINER.

1,273,557.  Specification of Letters Patent.  Patented July 23, 1918.

Application filed May 26, 1913. Serial No. 769,791.

*To all whom it may concern:*

Be it known that I, WILLIAM M. WHITE, a citizen of the United States, residing at Milwaukee, county of Milwaukee, and State of Wisconsin, have invented certain new and useful Improvements in Hydraulic Regainers, of which the following is a specification.

My invention relates to the water passages leading from hydraulic turbines and more particularly to the substitution of regainers for the draft tubes ordinarily used with water wheels.

In my copending application, Serial No. 774,528, filed June 13, 1913, I have claimed a method of operating water wheels in which the available head acting on the wheel is increased, due to certain peculiarities of operation; also the method of handling the water discharged from the wheel runner whereby such water is delivered to the tail race with minimum loss in energy.

In the usual practice the draft tubes from water wheels are in the form of circular conduits tapered from one diameter at the runner of the water wheel to a larger diameter at the end of the draft tube. In the latest practice the draft tube is curved in shape so as to discharge the water in the direction of its flow down the tail race. These draft tubes are made of plate steel or of concrete.

On account of the small distance between the horizontal center line of the water wheel and the level of the water in the tail race, it is usually necessary to make sharp bends in the draft tubes; also for the same reason the draft tubes are flared or increased in diameter rather quickly. In other words, on account of the small space available, the draft tube is not given the proper shape in order to obtain the best results.

To one familiar with the art it is readily understood that in order to obtain a high rotative speed of the runner, it is necessary to keep the outer diameter of the runner to a small diameter and at the same time in order to obtain a maximum amount of power for given conditions of head and speed it is necessary to permit excessive flow through the runner diameter mentioned above. The result is that there is considerable velocity, and, consequently, kinetic energy, in the water just as it leaves the turbine runner. In modern practice in the matter of relatively high speed wheels this kinetic energy may amount to as much as 20% of the total energy available in the total head under which the plant is operated. Since plant efficiency is of prime importance, it is evident that it is very desirable to make use of this kinetic energy in the high velocity of the water as it leaves the water wheel runner, to the end that the greatest mechanical power for a given quantity of water may be obtained. The form of the water passage from the runner to the tail race determines the extent to which kinetic energy is transformed into potential energy.

In changing the velocity of the water at the runner to pressure in the tail race under proper conditions the actual absolute pressure just underneath the runner is less than that in the tail race as measured from the surface of the water.

This action takes place in accordance with Bernoulli's law which is stated in "*Treatise on Hydraulics*" by Merriman, edition 1903, page 76, as follows:

"At any section of a tube or pipe, under steady flow without friction, the pressure head plus the velocity head is equal to the hydrostatic head that obtains when there is no flow."

As recited, above, the velocity of flow from the runner is necessarily made great for the reasons given. The velocity head plus the pressure head at the runner would be equal to the velocity head plus the pressure head in the tail race at the same level neglecting friction and eddy losses. The velocity head at the discharge of the runner is sometimes made a large percentage of the total head acting on the plant, say for example, 20%. The draft tube is usually of increasing capacity with the object of decreasing the velocity so that the velocity and consequently the kinetic energy will be low in the tail race. For example, this velocity head of the water in the tail race is usually as low as 3%. Now according to Bernoulli and in accordance with confirming experiments performed by me, and neglecting friction, the pressure head plus the 20% velocity head at the runner would be equal to the pressure head plus the 3% velocity head in the tail race or, in other words, in this case the pressure head (or equivalent free water surface) at the runner would be 17% of the total head less than (or lower than) the pressure head (or surface of) the tail water at the end of the draft tube. For example, should the head on a water power plant be twenty feet from the surface of the water above the plant to the surface of the water in the tail race, then, neglecting friction, and in accordance with the above example the equivalent surface of the water at the runner would be 3 4/10ths feet below the surface of the tail water. In other words, the effective head on the water wheel producing flow through it would be 23 4/10ths feet. However, on account of the limited space available for the installation of the usual form of draft tube, the greatest energy is not regained and my invention contemplates the substitution for the draft tube of a regainer which may be installed within the space available and yet transform with maximum efficiency the kinetic energy in the water from the runner into potential energy in the tail race.

The device which I propose to substitute for the draft tube consists of a disk or cone placed in the line of the flow of the water from the runner, whereby the water will be deflected along continuous passages of increasing area.

The action described in the foregoing description of this invention relating to the transformation of kinetic energy into potential energy in the manner described, is advantageous but incidental. The prime object in the installation of the disk or cone and the deflection of the water, substantially as outlined, is for the purpose of obtaining a radial flow in order to take advantage of the whirling action of the water as it leaves the runner.

In a water wheel there are pivoted guide vanes for controlling and directing the water to the revolving runner; there is a runner composed of vanes providing curved discharge passages between the vanes. The water flows into the vanes and through these passages and discharges from the runner in a direction opposite to the direction of rotation of the runner. The relative rotation of the discharge water with reference to a fixed point is dependent upon the velocity of the water through the runner and the rotation of the runner. In designing water wheel runners the object is to so relate the water passage of the runner and guide vanes that the velocity of water flowing from the runner passage will cause no whirl in the discharged water when the runner is rotating at normal speed; in other words, so that the water will flow vertically downward in case of the usual straight draft tube applied to a vertical water wheel. It is evident, however, that this condition can apply theoretically at only one setting of the guide vanes; that is, at one power and speed. As a matter of fact, from tests made by means of Pitot tubes, it has been determined that seldom if ever does the water flow in straight lines as outlined above. Therefore it is evident that when the guide vanes or distributing gates are closed to such a point that half the quantity of water is delivered to the turbine and the speed of the turbine maintained normal, the velocity of the water from the runner passages now is half what it was formerly so that there must be a whirl in the water in the direction of the revolving runner due to the difference in relative velocities between the discharge water and the runner.

The absolute velocity of the water being the combination of the downward and whirling velocities as above described now may be much greater than when the amount of water discharged was such that theoretically there should be downward discharge from the runner. In other words, although the quantity of water through the runner is decreased by one-half, the absolute velocity and consequently the kinetic energy in the water is greater than before, so that at this load, some device for transforming this kinetic energy into potential energy is of as great or greater importance than in the first described case.

I am now providing in the passages, substantially as shown, a space in which this water may whirl and by its centrifugal action produce a lower absolute pressure at the center of the runner than the absolute pressure as measured at the level of the surface of the tail water. In other words, energy is regained in a different way from that first described. The annular passage formed by the walls of the chamber and the surface of the cone or disk is such that the water whirling may pass outward and downward along a passage of increasing section with the least disturbance. The passage is such that the total water in it may be in a whirling condition and kept in this whirling condition by continued application of water from the runner in a whirling state so that there is in the passage as described a wheel of revolving water. The moving water as described, has centrifugal force and causes a difference in pressure between its inner and outer diameter and the amount of this difference is dependent upon the width of the whirling water radially and its tangential velocity. A particle of water leaving the runner vane would describe a spiral path in moving from the inner to the outer edge of this whirling water. On account of the enlarging passage, the absolute velocity of the particle above mentioned is decreasing from the runner to the outer edge of the passage shown and gives up or changes its kinetic energy into potential energy on this account.

It is understood that in a draft tube of the usual design a column of water is maintained. When the centrifugal action referred to, caused by the whirling of the water at the end of the runner vanes, takes effect in the column of water, an outer portion of the column is given a rotating action whereas the inner portion or strata of the column have less or no rotation. This causes a conflict of currents the effect being ebullition or whirling throughout the entire column, causing in some instances the displacement upwardly of the inner portion of the column, this inner portion again passing near and sometimes through the runner vanes.

Thus it will be seen that by the employment of the regainer referred to, no column of water is maintained in which this conflict of currents can be set up, the water falling into the gradually increasing area in divergent lines without opposition.

The invention will be more readily understood by reference to the accompanying drawings, wherein, Figure 1 is a transverse, vertical section of a typical power station, showing the application of one form of regainer;

Fig. 2 is an enlarged longitudinal section at right angles to Fig. 1;

Fig. 3 is an enlarged transverse section in the same relation as Fig. 1, and,

Fig. 4 is a horizontal section through the water wheel, parts being broken away to show the regainer in the plant.

Referring to the drawings and more particularly to Fig. 1, it will be seen that the surface of the head water is indicated at 10, there being a passage 11, controlled by suitable gates whereby the water is admitted through the adjustable guides 12, to the vanes 13, of a turbine. Power is transmitted from the turbine by means of a shaft 14, directly connected to a generator 15. Interposed in the space beneath the turbine is a disk-like deflector 16, arranged whereby a space 17, is provided there above, this space accommodating water discharged from the turbine and permitting a divergent flow thereof in all directions in such manner that the velocity of the water is transformed into pressure. On reference to Fig. 1 it will be seen that the capacity of the chamber at 21 (Fig. 1), is greater than the capacity at the cross section 20—20, and also greater than the capacity of the annular discharge section 22, 22, leading from said chamber. The cone or disk-like structure 16, is supported on suitable piers 18.

The water flows through the guide members at 19, through the runner at 20, is deflected at 21, by the cone 16, and thereafter flows in all directions as shown by the arrows at 22. The portion of the water discharging at the point 23, flows directly into the tail race while the water passing around the disk at 24, flows between the piers at 25, thence into the tail race at 26.

The lines at 27, indicate radial flow outwardly from the center which will obtain when the turbine is operating at normal load and rated speed, the water theoretically passing directly through the vanes without whirl or backward or forward flow with or against the vanes.

The stream lines at 28 indicate the flow of the water when the turbine is running at part load, the water then whirling in the direction of the runner due to the fact that the velocity of the water between the runner vanes is less than the speed of the vanes. The lines at 29 show flow in a direction opposite to the rotation of the runner which condition may arise when guides are wide open and the turbine is developing high power without maximum efficiency, that is, the velocity of the water between the vanes is greater than the speed rotation of the vanes.

The piers 18 are continuous below the disk 16, but end at the points 30, which points are placed about equi-distant radially from the center of the wheel. At this point the piers extend upwardly and afford a support to the turbine pit floor. The upstream ends 31, 32 of the piers are angularly disposed in order that they may collect their proper proportion of the water discharged over the disk to the end that there may be an equal velocity flowing from between the piers at the points 23, 26, 33, 34, 35, 36.

The angle of the general discharge passage with reference to the vertical line of the wheel may be varied at will to suit conditions. In low head plants the cone will probably be made flatter and nearer a disk, whereas in high head plants the deflector will preferably be more in the form of a cone.

It will be noted that in the construction shown I have employed concrete. It will be understood that the walls forming the passageways from the regainer may be constructed of other material than of concrete, as shown, as for instance, cast iron, plate steel, wood or a combination of any of these. It will also be understood that the arrangement shown is only typical and may be varied widely. I do not therefore wish to be limited to the exact construction shown.

By water wheel under the present specification and claims, I mean a water wheel, hydraulic turbine or any hydraulic power producing apparatus having a runner of such form as to cause the water to be discharged from it preferably axially to the rotation of the runner, and I mean especially any hyraulic power apparatus which may be used with my invention for the accomplishment of the results claimed. One type of a water wheel in the meaning of the specification and claims is illustrated in the drawings.

I claim:

1. The combination with an axial discharge water wheel, of an annular passage disposed at the discharge side of the wheel, around the axis thereof, taking a direction having a relatively large component which is at right angles to said axis, and of materially greater diameter than the wheel, whereby the whirling discharged water is mitted to follow the direction of its natural tendency, which is outward from the center of rotation.

2. In a device of the class described, the combination of a water-wheel having a water-discharge passage, and a deflector located in said passage and immediately adjacent and opposite to said wheel, whereby the flow of the water is changed from axial to substantially radial, said deflector and a wall of the water-discharge passage defining a space of progressively increasing capacity wherein the water is permitted to expand whereby the velocity head of the water is transformed into pressure head, substantially as described.

3. In a device of the class described, the combination of a water wheel and a water discharge passage, a deflector located in said passage and projected across the axis of said water wheel substantially radially thereof, said deflector and the walls of said passage above said deflector defining a chamber of increasing capacity in the direction of flow of water, said deflector causing divergent flow of water in a space of progressively increasing capacity whereby the velocity head of the water is transferred into pressure head, substantially as described.

4. In a device of the class described, the combination of a water-wheel having a water-discharge passage, and a deflector located in said passage immediately adjacent to said water wheel and disposed substantially radial to the axis thereof, said deflector having a form such as to cause divergent flow of water with a radial component in all directions from said discharge passage in a space of progressively increasing capacity whereby the velocity-head of the water is transformed into pressure head, substantially as described.

5. In a device of the class described, the combination of a water-wheel having a water-discharge passage, and a substantially conical deflector located in said passage, said conical deflector forming with curved walls above a chamber of increasing capacity in the direction of flow, said deflector causing substantially radial flow of water into a space of progressively increasing capacity whereby the velocity-head of the water is transformed into pressure head, substantially as described.

6. In a device of the class described, the combination of a water wheel runner, a runner tube over which said wheel is mounted, said tube being flared outwardly in all directions beneath said runner, and a deflector wall disposed transversely across the axis of the runner tube and substantially radially thereof, having a substantially conical surface and forming a passageway between the conical surface of the wall and the adjacent surface of the tube through which passageway the water is caused to flow.

7. In a pressure regainer for water wheels, the combination of a water wheel runner having an open space adjacent thereto, a deflector extending across said space and providing a flaring passage opening directly to the runner blades, arranged so that water discharged from said runner is at once permitted to expand radially in a space of progressively increasing capacity, substantially as described.

8. In a device for converting velocity head into pressure head, the combination of a water wheel runner having an open space immediately therebeneath, and a deflector projected across said space, leaving a free passage from the wheel to the center of the deflector, the arrangement being such that water discharged from the runner with energy in the form of velocity is at once caused to expand radially within a space of progressively increasing capacity, substantially as described.

9. In a pressure regainer for water wheels, the combination of a runner having an open space therebeneath, said space being arranged at and about the axis of said runner, and a deflector projected across said space and arranged substantially at right angles to the rotative axis of the runner, whereby water discharged from the runner and containing energy in the form of velocity is caused to enter and radially expand within a space of progressively increasing capacity, substantially as described.

10. In a pressure regainer for water wheels, the combination of a runner having an open space therebeneath, said space being arranged at and about the axis of said runner, and a substantially conical deflector projected across said space whereby water discharged from said runner with a tangential force is permitted to whirl and follow a spiral path within a space of progressively increasing capacity in order that the energy of the water in the form of velocity may be converted into energy in the form of pressure, substantially as described.

11. In a pressure regainer for water wheels, the combination of a runner having an open space at one extremity thereof, said space being located at and about the rotative axis of the runner, and a substantially conical deflector projected across said space, the apex of the cone being substantially in line with said rotative axis of the runner, the arrangement being such that water discharged from the runner with a tangential component of force is caused to immediately enter and continue its whirling action in a space of progressively increasing capacity in order that its energy in the form of velocity may be changed into energy in the form of pressure, substantially as described.

12. The combination with a water wheel having a discharge passage from the runner of said water wheel, of a deflector located in such passage from the runner, said deflector causing substantially radial flow of discharged water in all directions and permitting a portion of said water to flow around and behind said deflector, substantially as described.

13. In a pressure regainer for water wheels, the combination with a water wheel having a runner with inward and axial discharge of a deflector located in said passage from said runner, said deflector causing substantially radial flow in all directions into a space of progressively increasing capacity, said deflector being disposed to permit a portion of the discharge water to pass around and underneath said deflector, substantially as described.

14. The combination, with a water wheel, of a regainer comprising a discharge chamber and a deflecting surface disposed therein transversely across the discharge of the wheel and substantially radially thereof to form an inclined annular passage for receiving the water from the wheel, said annular passage communicating directly with the discharge end of the wheel.

15. The combination, with a water wheel, of a discharge conduit therefor including a flared tube, the walls of said tube diverging outwardly in all directions from the runner passage of the wheel and a deflector disposed in said flared tube transversely across the discharge of the wheel and substantially radially thereof to form with the walls of the tube an annular discharge passage communicating directly with the discharge end of the wheel to permit the free discharge of the water coming from the runner.

16. The combination with a water wheel, of a discharge chamber communicating directly with the discharge end of said wheel, a deflector disposed in said chamber transversely across the discharge of the wheel to form with the upper walls of said chamber a passageway to deflect the water from the wheel from axial to approximately radial flow in all directions, walls disposed in said chamber below said deflector to form flaring passageways, a portion of said water passing around and under said deflector and through said passageways below the deflector whereby the velocity head of the water may be changed into pressure head.

17. The combination with a water wheel, of a discharge chamber located directly beneath said wheel, a deflector disposed in said chamber transversely across the discharge of the wheel and substantially radially thereof to form with the upper walls of said chamber a passageway to deflect the water passing from the wheel from axial to outward flow in all directions, a portion of said water passing around and under said deflector.

18. The combination with the discharge of a water wheel, of a chamber having an inlet communicating with the said discharge, and a deflector located in said chamber and disposed opposite the inlet and transversely of the water wheel discharge and substantially radially thereof, said deflector having its periphery terminating short of the walls of the chamber and dividing said chamber into opposite compartments communicating with one another around the periphery of the deflector.

WILLIAM M. WHITE.

Witnesses:
CHAS. F. MURRAY,
T. D. BUTLER.